Oct. 10, 1961 A. E. JOHNSON 3,004,207
DIRECT CURRENT ARC WELDING APPARATUS
Filed Aug. 2, 1956
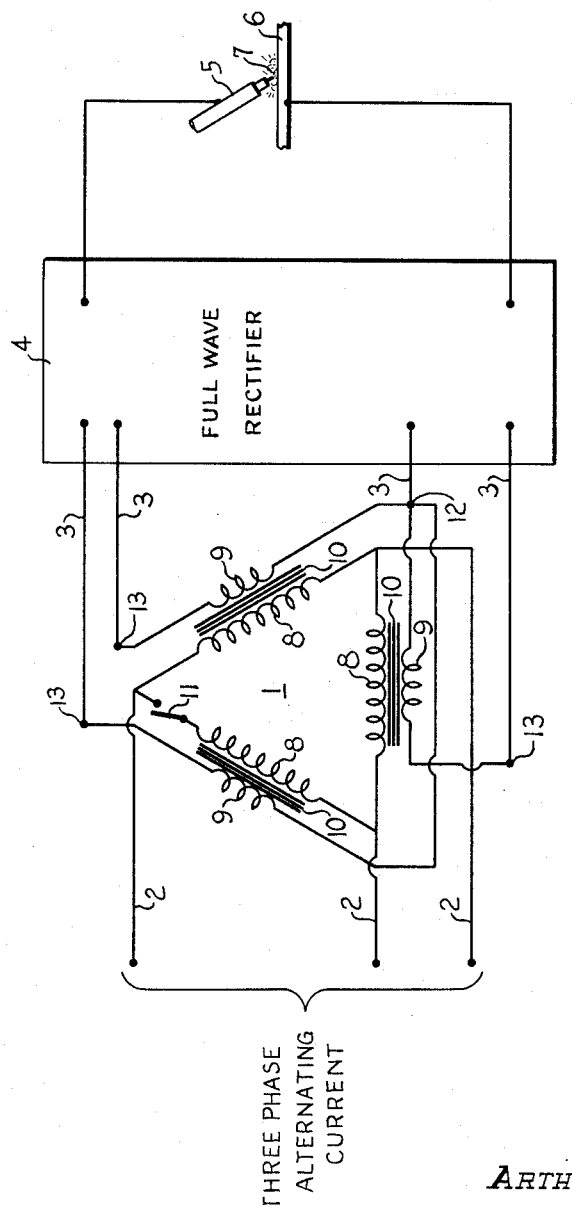
INVENTOR.
ARTHUR E. JOHNSON
BY Andrus & Scales
Attorneys

3,004,207
DIRECT CURRENT ARC WELDING APPARATUS

Arthur E. Johnson, Elkhorn, Wis., assignor to A. O. Smith Corporation, Milwaukee, Wis., a corporation of New York
Filed Aug. 2, 1956, Ser. No. 601,785
3 Claims. (Cl. 321—24)

This invention relates to a direct current arc welding apparatus and particularly to a three-phase transformer and rectifier providing arc welding current.

In arc welding, a single current source is preferably adapted to provide the necessary arc characteristic for various welding processes. When welding light gauge work having a shallow groove and when doing surface work, small arc penetration provides the most satisfactory result. On the other hand, when welding heavy gauge work having a deep groove, large arc penetration provides the most satisfactory result.

The present invention provides a welding current source connected to a three-phase current source and having a simple means to adjust the arc characteristic to provide either deep or shallow penetration.

In accordance with the present invention, the transformer is a three-phase transformer having a delta primary winding and a delta or a Y secondary winding. Contact means are provided in one phase of the primary winding to selectively connect or disconnect it from the power lines. When the contact means connects the phase in a complete circuit, a strong or forcing arc is provided for welding. When the contact means disconnects the phase from the power lines, a soft or smooth arc is provided for welding.

The present invention provides an arc welding transformer which has a dual arc characteristic and which is simple and low cost in construction.

The drawing furnished herewith illustrates the best mode presently contemplated for carrying out the invention.

The drawing is a schematic circuit diagram of a preferred embodiment of the invention.

Referring to the drawing, a three-phase transformer 1 is provided with its input leads 2 connected to a suitable three-phase source, not shown, and its output leads 3 connected to a rectifier 4. An electrode 5 and a workpiece 6 are connected in series with the output of the rectifier 4 which establishes and maintains an arc 7 between the electrode and work.

The transformer 1 comprises a primary winding of three individual coils or phase windings 8 and a secondary winding of three individual coils or phase windings 9 which are inductively coupled by an iron core, shown by a conventional line symbol 10. In welding machines, the transformer is generally of the leakage reactance variety having a well-known drooping volt-ampere characteristic or of a generally constant potential variety with accessory means to provide the drooping characteristic.

The individual coils 8 of the primary winding are connected in series in a closed loop to form the conventional three-phase delta winding. The three power leads 2 are connected one to each junction of the closed loop.

In series with one primary phase winding 8, a switch 11 is provided to selectively disconnect that winding from the circuit. As hereinafter described, when the coil 8 in series with switch 11 is connected in the circuit, a forcing arc is obtained and when the coil 8 in series with the switch 11 is disconnected from the circuit, a smooth arc is obtained. Each arc is particularly adapted for a certain welding process as previously described.

The secondary winding is shown as a Y-connected three-phase winding having the three individual coils 9 joined at a common junction 12 and three individual terminals 13.

The output from the secondary winding is connected to the input of the conventional full wave rectifier 4 by the output leads 3. The rectifier 4 changes the alternating current from the transformer 1 to a substantially direct current suitable for maintaining the arc 7 between the electrode 5 and the work 6.

The operation of the invention is as follows:

When the switch 11 is closed and therefore the serially connected coil 8 of the primary is connected in circuit, the dynamic characteristic of the arc 7 is such as to provide a deep or heavy penetration of the work. Consequently this arc characteristic is particularly adapted to weld thick material requiring heavy penetration.

When the switch 11 is opened and the series connected primary coil 8 is thereby disconnected from the circuit, the dynamic characteristic of the output changes and results in a smooth arc particularly suited for shallow or light penetration of the work.

Although the dynamic characteristics change to provide the desired penetration effect, the static characteristic remains substantially the same.

A three phase transformer within the scope of the invention includes three single phase transformers having their primary windings connected in a closed delta and the secondary windings connected in any suitable manner.

The present invention provides a welding machine readily and easily adapted to weld both heavy and light work. Further, the basic design of the transformer is not changed and a simple and low-cost dual operating current source is provided.

Various modes of carrying out the invention are contemplated as being within the scope of the following claims particularly pointing out and distinctly claiming the subject matter which is regarded as the invention.

I claim:

1. A direct current welding source for establishing a welding arc and controlling the characteristic of the welding arc, which comprises a polyphase transformer having a delta connected primary winding and an output suitable for establishing the welding arc, means to selectively connect and disconnect one branch of the primary winding from the circuit to change the characteristic of the welding arc, and means to rectify the output of the transformer to provide a direct current output.

2. A direct current welding source, which comprises a primary winding having three branches connected in delta, a secondary winding magnetically coupled to the primary winding, said coupling providing for magnetic leakage between said primary winding and said secondary winding to provide a drooping static characteristic of volts and amperes, means to rectify the output of said secondary winding, and means to selectively disconnect one of the branches of the primary winding from the circuit to change the dynamic characteristic of the output.

3. A direct current welding source, which comprises a magnetic core structure having at least three distinct magnetic portions, a primary winding having three branches connected in a delta circuit with each branch disposed upon a distinct magnetic portion, a secondary winding having three interconnected branches with each branch disposed upon a distinct magnetic portion to provide a drooping volt-ampere static characteristic, a full wave rectifier connected in circuit with the secondary winding to provide direct current welding power, and switch means connected in one branch of the primary winding to selectively connect and disconnect that branch from the circuit.

(References on following page)

References Cited in the file of this patent

UNITED STATES PATENTS

| | | |
|---|---|---|
| 751,016 | Rogers | Feb. 2, 1904 |
| 2,074,276 | Schmerber | Mar. 16, 1937 |
| 2,077,114 | Klinkhamer et al. | Apr. 13, 1937 |
| 2,175,927 | Steinert | Oct. 10, 1939 |
| 2,773,970 | Galbraith et al. | Dec. 11, 1956 |

OTHER REFERENCES

Alternating Current Electricity and Its Applications to Industry, by Timbie and Higbie, published by John Wiley & Sons (1916). Section 60, pp. 258–262 relied on.

Standard Handbook for Electrical Engineers, published by McGraw-Hill Book Co. Inc. (New York), 1949. Sections 6–104 (p. 588) and 14–177 (p. 1367) relied on.